INVENTOR.
BY GEORGE V. WOODLING

United States Patent Office 3,531,225
Patented Sept. 29, 1970

---

3,531,225
VALVE SYSTEM MEANS FOR STATOR-ROTOR MECHANISM
George V. Woodling, 22077 W. Lake Road, Rocky River, Ohio 44116
Filed Mar. 22, 1968, Ser. No. 715,247
Int. Cl. F01c *1/10;* F04c *1/06*
U.S. Cl. 418—61
2 Claims

ABSTRACT OF THE DISCLOSURE

Stationary valve and rotary valve for an orbital device having operating fluid chambers, in which the stationary valve has a stationary valve face and a plurality of fluid openings communicating with the fluid chambers. The rotary valve is mounted between the stationary valve face and an annular bushing which is axially supported by an internal housing rim. The rotary valve terminates in flange means comprising an external-rim flange and an internal-rim flange interconnected by a common intermediate annular body portion which has an end face defining substantially a circular sealing band disposed between first and second series of commutating fluid connection means commutatingly registering with the fluid openings in the stationary valve face.

---

My invention relates generally to a fluid pressure device having a station-rotor mechanism and more particularly to valve system means for controlling the entrance of fluid to and the exit of fluid from the stator-rotor mechanism.

This application is an improvement in my pending application, Ser. No. 637,382, filed May 10, 1967, now Pat. No. 3,405,603, and in my application, Ser. No. 684,705, filed Nov. 21, 1967, now abandoned.

An object of my invention is the provision of valve system means having a stationary valve and a rotary valve, in which the rotary valve has a rotary valve face provided with a first and a second series of commutating fluid connection means, and in which the stationary valve has a stationary valve face provided with radially extending, elongated fluid openings commutatingly communicating with both the first and second series of commutating fluid connection means in the rotary valve face.

Another object is the provision wherein the rotary valve has a common intermediate annular body portion which separates the first and second series of commutating fluid connection means.

Another object is the provision wherein the common intermediate annular body portion has an end face defining an annular surface area band disposed between and sealingly separating the first and second series of commutating fluid connection means.

Another object is the provision wherein the radially extending, elongated fluid openings in the stationary valve extend across the annular surface area band.

Another object is the provision wherein the rotary valve has a hollow shaft with a diameter less than that of the common intermediate annular body portion and wherein the hollow shaft is connected to the common intermediate annular body portion by an outwardly extending annular connection disk which is resistingly deformable in an axial direction to fix the axial length of the rotary valve.

Another object is the provision of axial fixation means to fix the axial length of the rotary valve.

Other objects and a fuller understanding of the invention may be had by referring to the following description and claims, taken in conjunction with the accompanying drawings, in which:

Figure 1:
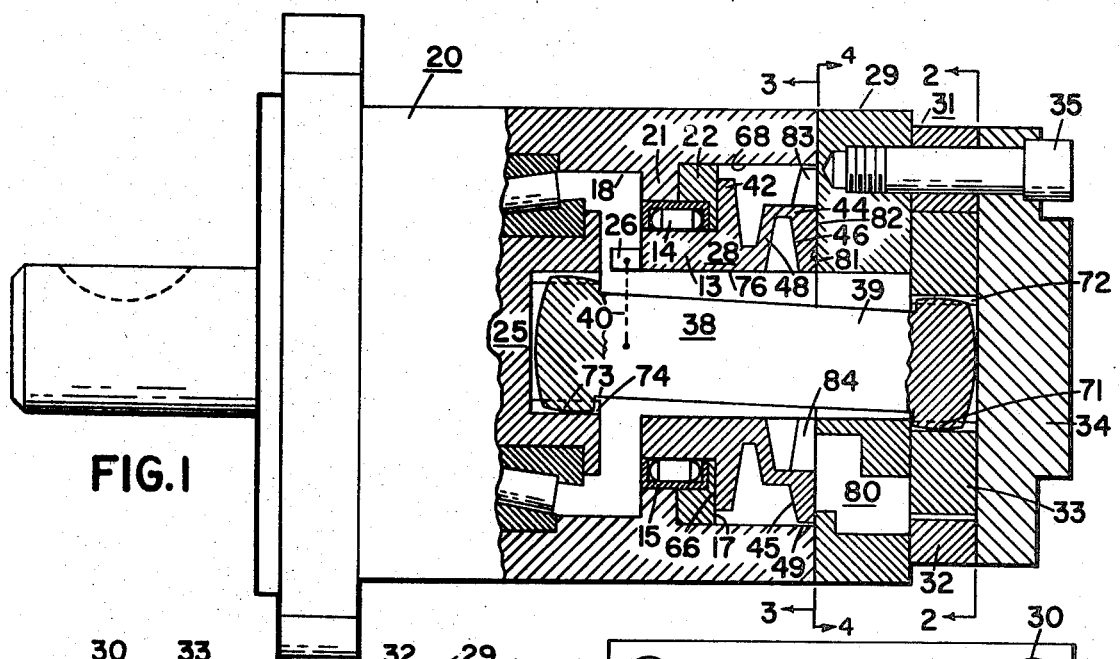
FIG. 1 is a side view of a fluid pressure device, in which my invention may be incorporated, parts being shown in vertical section to illustrate the rotary valve for controlling the entrance of fluid to and the exit of fluid from the stator-rotor mechanism, the section through the rotary valve means being taken along the line 1—1 of FIG. 5.

With reference to the drawings, the fluid pressure device is substantially the same as that shown and described in my above-mentioned applications and the description therein shall apply to this application with respect to common subject matter. The description in this application will be directed principally to the improvement of the valve system means.

Briefly, the fluid pressure device comprises a main housing 20, a main shaft 25 rotatively mounted in the housing, a stator-rotor mechanism 31 having a stator element 32 and a rotor element 33, a stationary valve member 29 and a rotary valve member 28. An end cap 34 enclosed the stator-rotor mechanism. The end cap may be held by a screw 35. An actuating shaft 39 drivingly interconnects the main shaft 25 to the rotor element 33. The actuating shaft 39 has an intermediate portion 38 disposed to rotate the rotary valve 28 through rotational drive means indicated by the dotted line 40. The stationary valve member 29 has face wall means including a stationary valve face 81 abutting against the end wall of the housing 20, whereby the housing and the stationary valve member constitute enclosure means for the rotary valve. The stationary valve member 29 may be secured to the end of the housing 20 by screws 30. The housing 20 is hollow from end-to-end, and intermediate the ends of the hollow housing, there is provided an internal rib 21, which generally separates the hollow housing into a left-hand end compartment in which the main shaft 25 is rotatively mounted and a right-hand end compartment in which the rotary valve is rotatively mounted.

Figure 3:
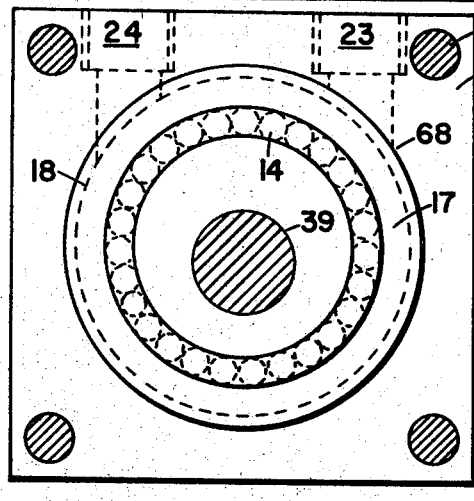
FIG. 3 is a view taken along the line 3—3 of FIG. 1, with the rotary valve being omitted, the view being principally a right-hand end view of the hollow housing showing the fluid ports and the bearing support means for the rotary valve, including a cross-section of the actuating shaft.

Pressed against the internal rib 21 is a bushing 22 having a right-hand stationary end face 17 disposed substantially parallel to and spaced axially from the stationary valve face 81. The rotary valve 28 is mounted between the stationary valve face 81 and the stationary end face 17 and has a rotary valve face 82 which makes a fluid sealing engagement with the stationary valve face 81 and a rotary end face 66 which makes a fluid sealing engagement with the stationary end face 17. The rotary valve 28 is mounted within a counter bore having an internal wall surface 68 surrounding and radially spaced from the rotary valve member 28 and defines therewith external (first) annular fluid chamber means which extends all the way around the rotary valve member. The external annular fluid chamber is connected in constant fluid communication with a fluid port 23 provided in the housing 20, see FIG. 3. The fluid port 23 extends through the housing wall and intersects with the internal wall surface 68, next adjacent the right-hand side of the bushing 22.

The rotary valve member 28 has a hollow shaft 13 with inside and outside surfaces. The hollow shaft 13 extends from the rotary valve member and has a bearing portion mounted with an anti-friction roller bearing unit 14. The bearing unit 14 comprises a plurality of roller bearings encompassing the bearing portion of the hollow shaft 13 and mounted within a cup 15 which is pressed into the inner surfaces of the rib 21 and the bushing 22. The hollow shaft 13 extends through, and has a terminating end portion provided with a boss 26 projecting in an axial direction beyond the roller bearing unit 14.

The rotary valve member 28 has a central opening defined by internal wall surface means 76. This opening, including also the opening in the hollow shaft 13, constitutes internal (second) annular fluid chamber means connected in constant fluid communication with a fluid port 24 provided in the housing 20, see FIG. 3. The fluid port 24 extends through the housing wall and intersects with an internal bore 18, next adjacent the left-hand side of the internal rib 21.

Figure 5:
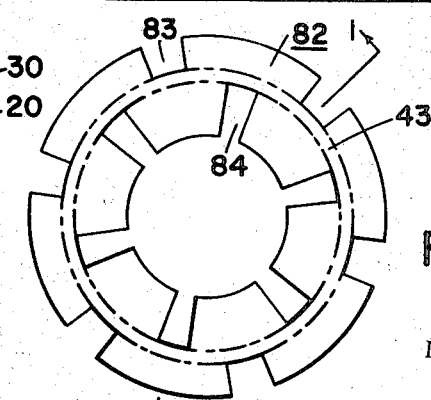
FIG. 5 is a view taken along the line 3—3 of FIG. 1, showing only the rotary valve face which sealingly engages the stationary valve face of FIG. 4.

The length of the rotary valve 28 must match the axially fixed length between the stationary end face 17 of the bushing 22 and the stationary valve face 81. To this end, the rotary valve 28 is provided with built-in axial fixation means, whereby its effective length may be varied to match the axially fixed length between the stationary end face 17 and the stationary valve face 81. As shown in FIG. 1, the hollow shaft 13 of the rotary valve 28 has an external annular flange 42 connected thereto and is provided with a sealing surface constituting the rotary end face 66 in fluid sealing engagement with the stationary end face 17 of the bushing 22. The hollow shaft 13, between the stationary end face 17 and the stationary valve face 81, may be characterized as comprising an annular valve body having a terminating end portion 44 with an end face constituting an annular surface area band 43, see FIG. 5, where the band 43 is indicated by the concentric dash-dot lines. The terminating end portion 44 has an external flange-rim 45 extending outwardly therefrom and an internal flange-rim 46 extending inwardly therefrom. Preferably, there is a clearance 49 between the outside of the external flange-rim 45 and the internal wall surface 68, with the result the rotary valve is solely supported for rotation by the anti-friction bearing unit 14. The external flange-rim 45 separates fluid in the external (first) annular fluid chamber from the stationary valve face 81 and the internal flange-rim 46 separates fluid in the internal (second) annular fluid chamber from the stationary valve face 81. The external flange-rim 45 and the internal flange-rim 46 define a rotary face which, together with the annular surface area band 43, constitutes the rotary valve face 82. The terminating end portion 44 of the annular valve body from which the external and internal flange-rims 45 and 46 extend, may be characterized as a common intermediate annular body portion having a diameter greater than that of the hollow shaft 13. Interconnecting the common intermediate annular body portion and the hollow shaft 13 is a sloping annular connecting disk 48 which may be resistingly deformable (bent) in an axial direction to fix the effective axial length of the rotary valve to match the axial distance between the stationary end face 17 and the stationary valve face 81. In assembly, the rotary valve 28 may be axially compressed until the rotary valve face 82 is flush with the end wall face of the housing and then, when the stationary valve member 29 is bolted to the end wall face of the housing, there is provided the right amount of axial fluid sealing clearance between the rotary valve face 82 and the stationary valve face 81. As the disk 48 is axially deformed in the compression operation, the rotary valve face 82 is maintained parallel to the stationary valve face 81 since the common intermediate annular body portion 44 is free to bend where it is connected to the disk 48. The axially deformable connection disk 48 constitutes a built-in axial fixation means by which the effective length of the rotary valve may be fixed by a compression operation.

In this application, the term "stator" and "rotor" are not used in a limited sense. The term "stator" is applied to the element which has a fixed axis and the term "rotor" is applied to the element which has a movable axis characterized in that said rotor is disposed for rotational movement about its own movable axis and for orbital movement about said fixed axis of the stator. Thus, in this application, the outer surrounding element, usually referred to as the stator, may be either the stator or the rotor, depending upon whether it has a fixed axis or a movable axis and the inner element, usually referred to as the rotor, may be either the rotor or the stator depending upon whether it has a movable axis or a fixed axis.

In the description, my device will be described as a fluid motor, but it is understood that it may be utilized for any other related purpose, particularly a pump.

Figure 2:
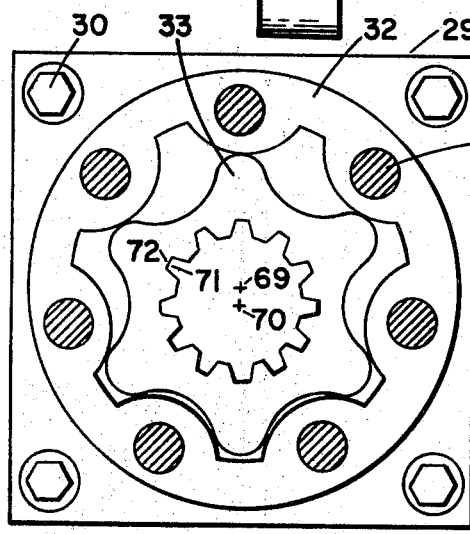
FIG. 2 is a view taken along the line 2—2 of FIG. 1, under the end cap, showing the stator-rotor mechanism.

As illustrated in FIG. 2, the stator element 32 has seven internal teeth which defines the outer wall of a fluid compartment. The rotor element 33 has six external teeth, one less than that of the stator element. The stator element may be described as having ($n$) number of internal teeth and the rotor element may be described as having ($n-1$) number of external teeth. The stator element has a center 69, usually referred to as the fixed or stationary axis since the stator element is stationarily mounted and does not rotate. In this application and claims, the expression "fixed stator axis" or simply "fixed axis," includes not only the fixed axis of the rotor, but also any axis which coincides, or in axial alignment therewith.

The rotor 33 has a movable axis, identified by the reference character 70, and is radially spaced from and moves in an orbital path about the fixed axis 69 of the stator. The orbital path of the movable axis 70 is a true circle with its center coinciding with the fixed axis of the stator. The diameter of the true circle, orbital path, is equal to the difference in the radial dimension between the crest contour and the root contour of a stator tooth. Upon relative movement between the rotor and the stator, the movable axis 10 of the rotor orbits in a true circle about the fixed axis of the stator. As the rotor moves within the stator, the inter-meshing teeth of the rotor and stator divide the fluid compartment confined therebetween into high and low pressure chambers along a revolving divisional line passing substantially diametrically through the fixed axis of the stator. For the position in FIG. 2, the divisional line is substantially diametrically vertical. For the position shown in FIG. 2, the divisional line may be more properly described as a divisional tapering band rather than a line and comprises substantially a slender triangle having an apex at the point where the top rotor tooth in FIG. 2 touches or contacts the arcuate surface of the stator contour and having a base defined by the distance between the sealing contact engagement on opposite sides of the bottom rotor tooth when fitting full-depth into the bottom stator tooth. To rotate the rotor 33 in a clockwise direction, the chambers on the left-hand side of the revolving divisional line or tapering band become high pressure chambers and the chambers on the right-hand side become low pressure chambers. The high and low pressure chambers, which may be referred to as operating chambers, alternately expand and contract as the rotor and stator move relative to each other. The divisional line or tapering band continually revolves in a counter-clockwise direction as the rotor rotates in a clockwise direction within the stator.

As shown in FIG. 1, the actuating shaft 39 has a right-hand end portion provided with male spline teeth 71 which fit within female spline teeth 72 in the rotor, being referred to herein as first connection means. Thus, the right-hand end portion of the actuating shaft 39 is disposed for rotational movement about its own movable axis and for orbital movement about the fixed axis of the stator. The connection means between the left-hand end portion of the actuating shaft 39 and the main shaft 25, herein referred to as second connection means, also comprises male spline teeth 73 on the actuating shaft 39 which fit within female spline teeth 74 in the central core of the main shaft 25. The left-hand end portion of the actuating shaft, that is the second connection means, is disposed for rotational movement substantially free from orbital movement about the fixed axis of the stator. A third connection means comprises drive means indicated by the dotted line 40 which interconnects the intermediate shaft portion 38 with the boss 26 for rotating the rotary valve 28 one rotation for each rotation of the actuating shaft.

In operation there is a disposition for the rotary valve to have a circumferential rotational phasing with respect to the rotation of the actuating shaft 39. During certain portions of the orbit movement of the actuating shaft, the rotational phasing has the effect of subtracting from the rotation of the actuating shaft, with the result that the speed of rotation of the rotary valve is reduced. During other portions of the orbit movement, the rotational phasing has the effect of adding to the rotation of the actuating shaft, with the result that the speed of rotation of the rotary valve is increased. The rotational phasing makes a fresh start at the beginning of each orbit and terminates at the end of each orbit. The amount of the circumferential displacement resulting from the rotational phasing is a function of the radius of the orbital movement at the intermediate portion 38 of the actuating shaft. The rotational phasing has the effect of varying the timing of the rotary valve with respect to the movements of the rotor within the stator and produces a new valving action.

The valve system means in the present application, comprising the rotary valve member 28 and the stationary valve member 29 operates substantially the same as that shown and described in my above mentioned applications. To this end, the external flange-rim 45 has a first series of six commutating fluid connection means 83 extending therethrough and connects the external (first) annular fluid chamber means, outside of the rotary valve, in constant fluid communication with the stationary valve face 81. The internal flange-rim 46 has a second series of six commutating fluid connection means 84 extending therethrough and connects the internal (second) annular fluid chamber means, inside the rotary valve, in constant fluid communication with the stationary valve face 81. The annular surface area band 43 is disposed between and sealingly separates the first and second series of commutating fluid connection means 83 and 84. It will also be seen that the common intermediate annular body portion 44 separates the first and second series of commutating fluid connection means 83 and 84. The first and second series of commutating connection means are alternately disposed with respect to each other and are circumferentially disposed relative to the fixed axis and spaced at annular intervals thereabout at substantially 30 degrees from each other. The stationary valve member 29 has seven fluid openings 80 communicating respectively with the operating fluid chambers in the stator-rotor mechanism. The seven fluid openings 80 in the stationary valve member 29 terminate respectively in the stationary valve face 81, with the fluid opening being circumferentially disposed about the fixed axis and spaced at annular intervals thereabout at 51 3/7 degrees from each other.

In operation as a fluid motor, high pressure fluid from the high pressure port 23 commutatively flow through the first series of commutating fluid connection means 83 of the rotary valve into the fluid openings 80 of the stationary valve member 29 and thence into the expanding pressure fluid chambers in the stator-rotor mechanism and drives the rotor 33 in a clockwise rotational direction within the stator 32. As the rotor is driven, the exhaust fluid in the low pressure contracting chambers commutatively flows through the fluid openings 80 of the stationary valve 29 into the second series of fluid commutating connection means 84 of the rotary valve and thence to the low pressure port 24. As the rotor is driven by the high pressure fluid, it operates the main shaft 25 through the actuating shaft 39.

Figure 4:
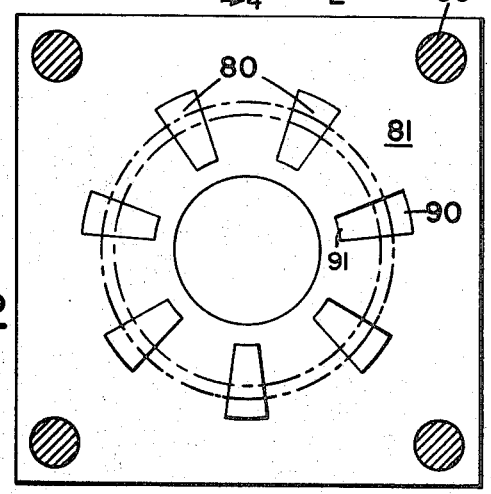
FIG. 4 is a view taken along the line 4—4 of FIG. 1, and showing the side of the stationary valve member against which the rotary valve sealingly engages.

The registration of the fluid connection means provided by the rotating valve face 82 in sealing engagement with the stationary valve face 81 is such that there is a first series of commutating fluid connections between the high pressure port 23 and the expanding fluid chambers in the stator-rotor mechanism and a second series of commutating fluid connections between the contracting fluid chambers and the low pressure port 24. In FIG. 4, the place where the annular surface area band 43 rotates against the stationary valve face 81, is illustrated by the concentric dash-dot lines being the same as the dash-dot lines in FIG. 5. Thus, the terminal openings 80 have an outer portion 90 and an inner portion 91 respectively residing outside and inside the place where the annular surface area band 43 rotates against the stationary valve face 81. As will be seen, the outer portion 90 and the external (first) annular fluid chamber, outside of the rotary valve, are commutatively connected together, and the inner portion 91 and the internal (second) annular fluid chamber, inside of the rotary valve, are commutatively connected together. In this construction, the terminal openings 80 have an elongated dimension in a radial direction extending across the annular band 43, whereby fluid may commutatively flow through both the first and second series of fluid connection means 83 and 84. The elongated dimension of the terminal openings 80 are such that they radically overlap the first and second series of fluid connection means 83 and 84 during commutation movement.

The rotating valve 28 is independent of any radial thrust or of any end thrust to which the main shaft 25 may be subjected. Also the rotating valve 28 is substantially free from any radial thrust or any end thrust due to fluid pressure acting thereupon. In summary, the valve system means, including the rotary valve 28 and the stationary valve member 29, controls the entrance of fluid to and the exit of fluid from the operating chambers of the stator-rotor mechanism.

The drive means indicated by the dotted line 40 may be the same as that shown in my application Ser. No. 684,705 filed Nov. 21, 1967, and may comprise generally an outwardly extending cam actuating member having an end portion interfitting with the boss 26 which functions as a cam follower for rotating the rotary valve once for each rotation of the actuating shaft 39.

The rotary valve may also be driven from the main shaft 25 and may be the same as that shown in my application, Ser. No. 684,705 filed Nov. 21, 1967, in which the boss 26 is adapted to fit into a radial recess or slot provided in the end face of the main shaft 25.

What is claimed is:

1. In a fluid pressure device having first and second fluid chamber means and a fluid pressure mechanism comprising a stator and a rotor defining alternately operating fluid chambers, said stator having a fixed axis, said rotor having a movable axis, said rotor having a rotational movement about its own movable axis and an orbital movement about said fixed axis, valve system means including stationary valve means and rotary valve means for controlling the entrance of fluid to and the exit of fluid from said alternately operating fluid chambers, said stationary valve means having a stationary valve face disposed transversely with respect to said fixed axis, said rotary valve means having an annular valve body defined by external and internal wall surface means, said first fluid chamber means defined by first chamber wall means including said external wall surface means, said second fluid chamber means defined by second chamber wall means including said internal wall surface means, said annular valve body terminating in flange means having a rotary valve face sealingly engaging said stationary valve face, said flange means comprising an external flange-rim, an internal flange-rim and a common intermediate annular body portion interconnecting said external and internal flange-rims, said external flange-rim extending outwardly from said common intermediate annular body portion and separating fluid in said first fluid chamber means from said stationary valve face and said internal flange-rim extending inwardly from said common intermediate annular body portion and separating fluid in said second fluid chamber means from said stationary valve face, said stationary valve means having fluid openings communicating respectively with said operating fluid chambers, said fluid openings terminating in said stationary valve face with said terminating fluid openings disposed circumferentially relative to said fixed axis, said external flange-rim having a first series of commutating fluid connection means extending therethrough and connecting said first fluid chamber means in constant fluid communication with said stationary valve face, said internal flange-rim having a second series of commutating fluid connection means extending therethrough and connecting said second fluid chamber means in constant fluid communication with said stationary valve face, said first and second series of commutating fluid connection means being circumferentially disposed relative to said fixed axis and commutatingly registering with said terminating fluid openings in said stationary valve face, said common intermediate annular body portion separating said first and second series of commutating fluid connection means, and actuating means driven by said rotor for rotating said rotary valve means relative to said stationary valve means, said rotary valve means having a hollow shaft with a diameter less than that of said common intermediate annular body portion, and annular connection means extending outwardly from and interconnecting said hollow shaft to said common intermediate annular body portion.

2. The structure of claim 1, wherein said outwardly extending annular connection means is resistingly deformable in an axial direction to fix the axial length of said rotary valve means.

References Cited

UNITED STATES PATENTS

| 3,405,603 | 10/1968 | Woodling | 91—56 |
| 3,272,142 | 9/1966 | Easton | 103—130 |
| 3,289,601 | 12/1966 | Compton | 103—130 |
| 2,918,078 | 12/1959 | Cummings | 251—157 XR |

FOREIGN PATENTS

| 54,081 | 3/1920 | Sweden. |

MARTIN P. SCHWADRON, Primary Examiner

I. C. COHEN, Assistant Examiner

U.S. Cl. X.R.

251—157